United States Patent [19]

Azuma et al.

[11] Patent Number: 5,328,532
[45] Date of Patent: Jul. 12, 1994

[54] METHOD OF FORMING PLY MEMBER

[75] Inventors: Toshio Azuma, Higashiyamato; Masataka Minakawa, Kodaira, both of Japan

[73] Assignee: Bridgestone Corporation, Tokyo, Japan

[21] Appl. No.: 84,321

[22] Filed: Jun. 30, 1993

Related U.S. Application Data

[63] Continuation of Ser. No. 805,983, Dec. 12, 1991, abandoned.

[30] Foreign Application Priority Data

Dec. 28, 1990 [JP] Japan ................. 2-418080

[51] Int. Cl.$^5$ ............................................. B29D 30/06
[52] U.S. Cl. ................................. 156/134; 156/304.1; 156/414
[58] Field of Search ............... 156/123, 414, 406.4, 156/304.1, 133, 134, 124, 128.1, 128.6, 405.1, 414; 152/542

[56] References Cited

U.S. PATENT DOCUMENTS

| | | | |
|---|---|---|---|
| 1,985,997 | 1/1935 | Keeran . | |
| 2,840,857 | 7/1958 | Lett | 425/20 |
| 3,826,297 | 7/1974 | Alderfer | 152/542 |
| 3,947,308 | 3/1976 | Brinkley et al. | 156/133 |
| 5,073,226 | 12/1991 | Suzuki et al. | 156/134 |

FOREIGN PATENT DOCUMENTS

| | | |
|---|---|---|
| 0417991 | 3/1991 | European Pat. Off. . |
| 1228794 | 1/1963 | Fed. Rep. of Germany . |
| 2204511 | 5/1974 | France . |
| 4976978 | 7/1974 | Japan . |
| 397532 | 4/1991 | Japan . |

*Primary Examiner*—Michael W. Ball
*Assistant Examiner*—Richard Crispino
*Attorney, Agent, or Firm*—Sughrue, Mion, Zinn, Macpeak & Seas

[57] ABSTRACT

A method of forming a ply member such as a carcass ply for a radial tire. The ply member is formed a plurality of belt-shaped members having a width obtained by multiplying $\pi$ inches by an integral number (1, 2, 3, . . . ) and a constant length. These belt-shaped members are successively attached one by one onto a forming drum having an outer circumferential length obtained by multiplying $\pi$ inches by an integral number so that the side edges of the belt-shaped members are arranged in parallel with the axis of the forming drum. The adjacent side edges of the belt-shaped members in circumferential directions of the forming drum are forced closer together to butt-join the faces of the side edges with each other. In case that the forming drum is a polygonal cylindrical forming drum whose one side of the polygon has a length obtained by multiplying $\pi$ inches by an integral number, the belt-shaped members are more easily attached to the forming drum.

3 Claims, 3 Drawing Sheets

METHOD OF FORMING PLY MEMBER

This is a continuation of application Ser. No. 07/805,983 filed Dec. 12, 1991, now abandoned.

BACKGROUND OF THE INVENTION

This invention relates to a method of forming a ply member, particularly a carcass ply for a radial tire.

A method of forming ply members of this kind hitherto used was disclosed in Japanese Patent Application Laid-open No. 49-76,978. In this disclosed method, after the outer circumferential length of a forming drum is divided into n sections of equal circumferential lengths, n pieces of belt-shaped members are progressively attached to the respective divided sections of the outer circumference of the forming drum so that the belt-shaped members extend in parallel with the axis of the forming drum to form a carcass ply.

In this method of the prior art, however, when sizes of tires or diameters of forming drums are changed, it is required to change widths of belt-shaped members. Therefore, belt-shaped members having widths compatible with the diameters of forming drums must be prepared for forming drums to be used. In other words, every time the diameter of the forming drum is changed, different belt-shaped members must be supplied to a feeder so that processes for forming ply members are considerably increased and spaces for storing a lot of kinds of belt-shaped members are also increased.

In this method of the prior art, moreover, a plurality of belt-shaped members are attached on the outer circumferential surface of a forming drum in overlapping or abutting state. With the former state, the overlapping portions of formed ply members are higher than the remaining portions so that tires produced from such ply members including the overlapping portions are poor in uniformity. With the latter state, there are mixed with overlapping portions and not joined portions at the abutting edges of the belt-shaped members attached around the forming drum in connection with extending directions of embedded reinforcing cords. Consequently, the quality of joined portions does not fulfill the usual requirement and the uniformity of produced tires becomes insufficient.

SUMMARY OF THE INVENTION

It is a primary object of the invention to provide a method of forming a ply member, which overcomes all the problems of the prior art and which need not change of belt-shaped members of different widths even if diameters of forming drums are changed, and eliminates the need for a changing operation and for storing of various kinds of belt-shaped members.

It is another object of the invention to provide a method of forming a ply member, which is able to produce tires superior in uniformity and joined quality by forcing closer together the faces of side edges of belt-shaped members adjacent in circumferential directions to perform the butt-joining of them.

In order to accomplish these objects, in a method of forming a ply member by successively attaching a plurality of belt-shaped members of a constant length to a whole circumference of a forming drum and by butt-joining side edges of the belt-shaped members adjacent circumferentially of the forming drum, the method according to the invention comprises steps of forming the belt-shaped members to have a width obtained by multiplying $\pi$ inches by an integral number; successively attaching these belt-shaped members one by one onto a forming drum having an outer circumferential length of an integer multiple of said width and of $\pi$ so that side edges of the belt-shaped members are arranged in parallel with the axis of the forming drum; and forcing closer together the adjacent side edges of the belt-shaped members in circumferential directions of the forming drum to butt-join the faces of the side edges with each other.

In a preferred embodiment, the forming drum is a polygonal cylindrical forming drum, whose one side of the polygon has a length obtained by multiplying $\pi$ inches by an integral number, for example, $\pi$ inches, and the belt-shaped members are attached to flat surfaces of the forming drum one by one.

Moreover, the forcing step preferably includes projecting a plurality of pin members through slits extending in the axial direction of the forming drum, which pin members are formed in the forming drum with an interval corresponding to the width of the belt-shaped members in the circumferential direction of the forming drum, bringing the faces of the side edges of the belt-shaped members adjacent in the circumferential directions into contact with the pin members to produce slacks of the side edges of the belt-shaped members by contracting the forming drum to reduce its diameter, and after retracting the pin members radially inwardly, applying circumferential pulling forces to the slacks of the side edges on inner and outer sides of the forming drum to accomplish the butt-joining of the faces of the side edges of the belt-shaped members.

In the method according to the invention, the width of belt-shaped members as constituent members of a ply member is always, for example, $\pi$ inches which is a value obtained by dividing the outer circumferential length of the forming drum by an integral number regardless of diameters of forming drum. These belt-shaped members having such a width can be successively attached to the outer circumferential surface of the forming drum with side edges of these members extending in parallel with the axis of the forming drum to cover just over all the outer circumferential surface or surfaces. With this arrangement, the belt-shaped members of this kind are applicable to various kinds of forming drums without changing belt-shaped members of different widths. Therefore, the method according to the invention eliminates the need for preparing various kinds of belt-shaped members different in width, for storing these various kinds of belt-shaped members in great spaces, and for changing the widths of belt-shaped members depending upon diameters of forming drums. Accordingly, the method according to the invention is very advantageous in operation efficiency and occupied space.

According to the invention, moreover, by forcing closer together adjacent side edges of the belt-shaped members in circumferential directions of the forming drum to butt-join the faces of the side edges with each other, the faces of the side edges of belt-shaped members can always be properly and strongly joined with the faces of the side edges of the adjacent members, as a result of which tires superior in uniformity and joined quality can be produced.

Furthermore, if the forming drum is a polygonal cylindrical forming drum, whose one side of the polygon has a length obtained by multiplying $\pi$ inches by an integral number, for example, $\pi$ inches, and the belt-shaped members are attached to flat surfaces of the forming drum one by one, the belt-shaped members are very easily attached to the forming drum.

Moreover, the faces of the side edges of the belt-shaped members adjacent in the circumferential directions are brought into contact with the pin members extending through slits of the forming drum to produce slack of the side edges of the belt-shaped members by contracting the forming drum to reduce its diameter. After the pin members are retracted radially inwardly, circumferential pulling forces are applied on inner and outer sides of the forming drum to the slacks of the side edges to accomplish the butt-joining of the faces of the side edges of the belt-shaped members. The faces of the side edges of the belt-shaped members can be more exactly joined with each other with high joining strength in this manner.

While the belt-shaped members have the width of $\pi$ inches as explained in the above description, the width may be $2\pi$ inches or $3\pi$ inches. In such a case, the number of the belt-shaped members is one half or one third of the number of the members having the width of $\pi$ inches.

The invention will be more fully understood by referring to the following detailed specification and claims taken in connection with the appended drawings.

BRIEF DESCRIPTION OF THE DRAWINGS

FIG. 4b is a schematic sectional view of the apparatus shown in FIG. 4a.

DESCRIPTION OF THE PREFERRED EMBODIMENTS

Figure 1:
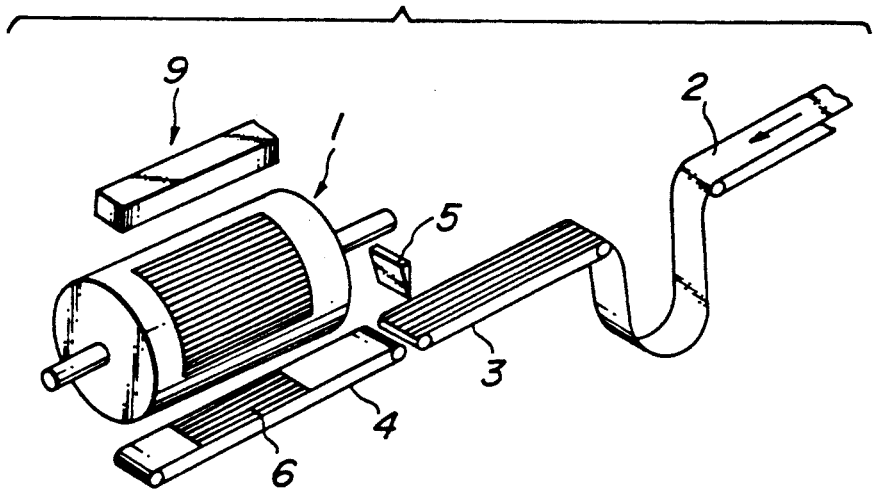
FIG. 1 is a perspective view exemplarily illustrating an apparatus for carrying out the method according to the invention.

Referring to FIG. 1 which is a schematic perspective view illustrating one embodiment of the method according to the invention, a long strip 2 is steadily supplied to a forming drum 1 which is cylindrical and arranged at a predetermined position.

The long strip 2 supplied into the axial direction of the forming drum 1 by a feeding conveyor 3 has a width obtained by multiplying $\pi$ inches by an integral number (positive number). The width of the long strip 2 is, for example, $\pi$ inches (integral number=1) in this embodiment. Every time when part of the long strip 2 having a predetermined length has moved onto a constant length member feeding conveyor 4, the strip 2 is cut off in the predetermined length by a cutter 5 provided between the conveyors 3 and 4 stopped at the moment to form a belt-shaped member 6. Belt-shaped members 6 are formed one by one in this manner.

The belt-shaped member 6 thus formed having the predetermined length is transferred by the constant length member feeding conveyor 4 extending immediately below the forming drum 1 to a predetermined position relative to the forming drum 1. When the belt-shaped member 6 has arrived at the predetermined position, the constant length member feeding conveyor 4 itself is raised to attach the belt-shaped member 6 with side edges thereof extending in parallel with the rotating axis of the forming drum 1 to the outer circumferential surface of the forming drum 1 which has been previously indexed in a predetermined angular position.

Thereafter, the forming drum 1 is indexed by the center angle corresponding to the circumferential length of $\pi$ inches, while the next belt-shaped member 6 is transferred to the predetermined position by the constant length member feeding conveyor 4. The belt-shaped member 6 is then raised by the raising movement of the conveyor 4 to attach the belt-shaped member 6 to the forming drum 1. The same operation is then successively repeated until belt-shaped members 6 have been attached to the entire circumference of the forming drum 1.

In this manner, all the plural belt-shaped members 6 having the width of $\pi$ inches in this embodiment are snugly attached to the outer circumference of the forming drum 1 without clearance or overlapping, regardless of diameters of the forming drums 1. Therefore, it is possible to eliminate substantially all the difficulties due to preparation and storage of various kinds of belt-shaped members and exchanging of belt-shaped members corresponding to diameters of forming drums.

In connection with the outer circumferential length of the forming drum 1, the width of one belt-shaped member 6 may be $2\pi$ inches, $3\pi$ inches and so on. If the width of the belt-shaped member 6 is $2\pi$ inches or $3\pi$ inches, the number of the members 6 attached to the outer circumference of the forming drum 1 may be one half or one third of the number of the members 6 having the width of $\pi$ inches.

In conjunction with the attaching of the constant length belt-shaped members 6 described above, the belt-shaped members 6 adjacent one another on the circumference of the forming drum 1 are forced closer together in the circumferential directions of the drum 1 so that the side edges of the members 6 are brought into abutment against and butt-joined with each other.

Such butt-joining of the side edges of the belt-shaped members 6 can be performed by means of so-called "zippers" disclosed in Japanese Patent Application Laid-open Nos. 58-29,647 and 63-1,531. As an alternative, it may be effected by applying circumferential attractive forces to the adjacent belt-shaped members 6 from the inside and outside of the forming drum 1 by means of the apparatus proposed by the applicant of the present application in Japanese Patent Application Laid-open No. 1-236,710.

Figure 2:
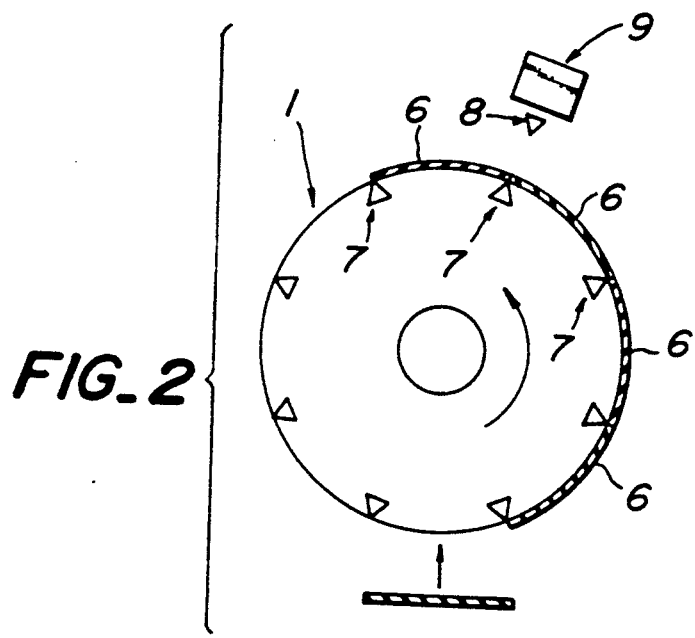
FIG. 2 is a schematic cross-sectional view of a forming drum for exemplarily illustrating joining means for side edges of belt-shaped members in carrying out the method according to the invention.

In carrying out the latter method, as shown in a schematic cross-sectional view of FIG. 2, a plurality of inner joining means 7 are arranged with a circumferential interval corresponding to the width of the belt-shaped members 6 in the forming drum 1. On the other hand, a joint device 9 having outer joining means 8 is arranged at one position outside the forming drum 1. When side edges of the adjacent belt-shaped members opposite to the inner joining means 7 have arrived at the position in opposition to the outer joining means 8 upon indexing the forming drum 1 as shown in FIG. 2, the inner and outer joining means 7 and 8 are actuated to apply external forces pulling the edges of the adjacent members 6 toward each other. As a result, the faces of the side edges of the adjacent belt-shaped members 6 are sufficiently strongly butt-joined with each other with the aid of the joining means 7 and 8 inside and outside the forming drum 1.

Figure 3A:
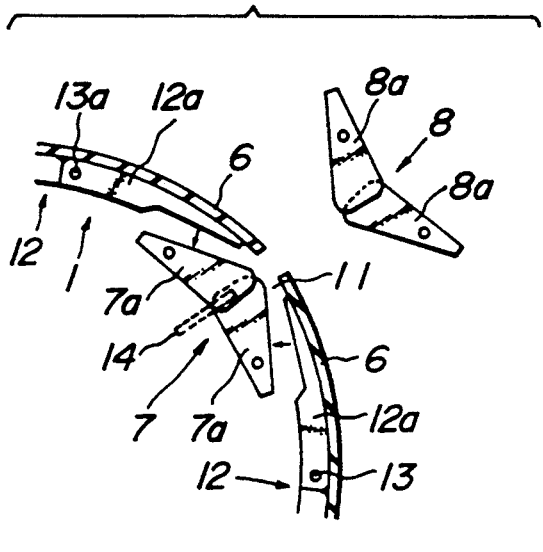
FIGS. 3a, 3b, 3c and 3d are partial sectional views exemplarily illustrating butt-joining processes in carrying out the method according to the invention.
Figure 3B:
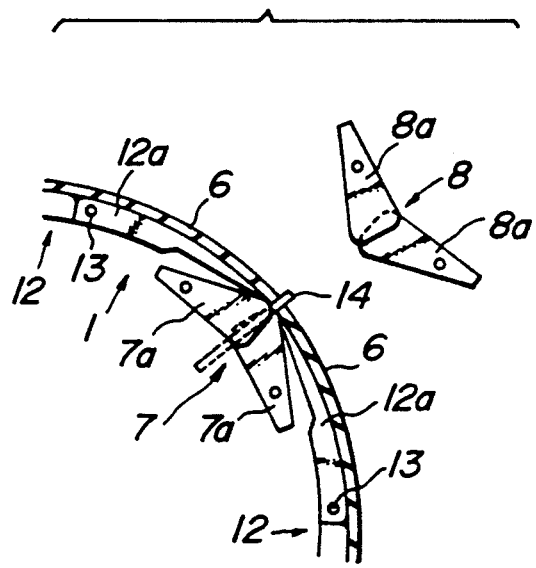

The joining operation described above will be explained in detail with reference to FIGS. 3a to 3d illustrating the butt-joining process. FIG. 3a illustrates the forming drum 1 which has expanded to enlarge its diameter to an intermediate extent and two adjacent belt-shaped members 6 whose side edges are spaced from each other with a certain clearance which has been brought into opposition to the outer joining means 8 by indexing the forming drum 1. The forming drum 1 includes arcuate segments 12 whose segment pieces 12a define slits 11 therebetween extending in axial directions of the forming drum 1 on its circumference. The segment pieces 12a of the arcuate segments 12 are then rocked radially inwardly about their pivot pins 13 to bring the adjacent ends of the segment pieces 12a into contact with joining pawls 7a of the inner joining means 7, respectively, as shown in FIG. 3b. At the same time, pin members 14 are caused to project radially outwardly from the inside of the forming drum 1 through the slit 11 so that the outer ends of the pin members 14 project out of the forming drum.

Under this condition, the faces of the side edges of the adjacent belt-shaped members 6 are closely adjacent each other and closely adjacent the pin members 14, as a result of the rocking movement of the segment pieces 12a of the arcuate segments 12.

Figure 3C:
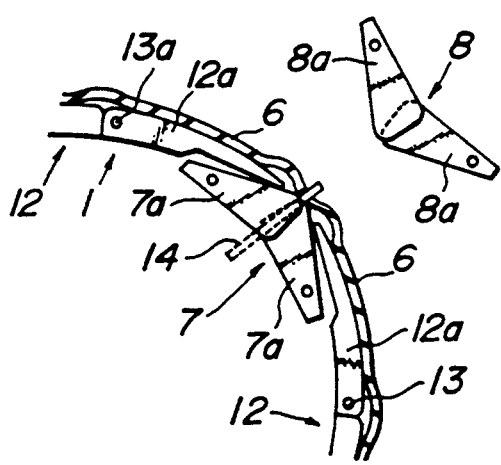

Thereafter, the forming drum 1 is contracted to reduce its diameter to its minimum value so that the arcuate segments 12 are moved radially inwardly. As a result, the side edges of the belt-shaped members 6 are free from the attraction of the arcuate segments 12 and relaxed to cause slacks so that they expand radially outwardly, while they are in contact with the pin members 14 as shown in FIG. 3c.

In this case, a number of the pin members 14 extend radially outwardly along the slit 11 and the faces of the side edges of the belt-shaped members 6 abut against the pin members 14 so that the clearance between the faces of the side edges of the belt-shaped members 6 are kept at a predetermined value. Therefore, upon butt-joining the faces of the side edges as later described, the snug joining is accomplished with high joining strength.

Figure 3D:
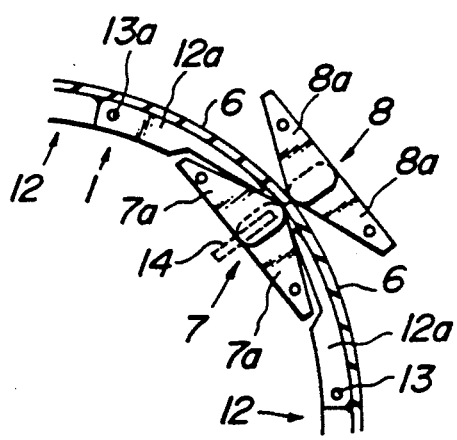

Thereafter, joining pawls 8a of the outer joining means 8 are displaced toward the inner joining means 7, while at the same time the pin members 14 are retracted radially inwardly so that the side edges of the belt-shaped members 6 are embraced between the joining pawls 7a and 8a of the inner and outer joining means 7 and 8. The displacement of the joining pawls 8a continues to urge the joining pawls 7a radially inwardly so that the joining pawls 7a and 8a are pivotally rotated about the respective pivotal pins against urging forces of elastic means (not shown) as shown in FIG. 3d. In this manner, the joining pawls 7a pull the side edges of the belt-shaped members 6 on the inner side and the joining pawls 8a pull the side edges of the members 6 on the outer side toward each other so that the butt-joining of the side edges of the belt-shaped members 6 is established.

After one butt-joining of the two adjacent belt-shaped members 6 has been completed, the outer joining means 8 is returned to the initial position as shown in FIG. 3a, with the result that the joining pawls 7a and 8a of the respective joining means 7 and 8 are returned into original positions by the action of the elastic means (not shown).

The the forming drum 1 is then expanded to return its diameter to the intermediate extent. Thereafter, the indexing of the forming drum 1 and the butt-joining described above are successively performed for all the joining portions of adjacent belt-shaped members 6. As a result, the complete attachment of belt-shaped members 6 to the entire circumference of the forming drum 1 and all the butt-joining of the side edges of the belt-shaped members 6 are performed so that the forming of a ply member on the forming drum 1 is completed.

Bead rings are then secured to the ply member thus formed on the forming drum, and a belt member, a tread member and the like are then attached to the ply member. This assembly is then formed and vulcanized to obtain a final tire.

Figure 4A:
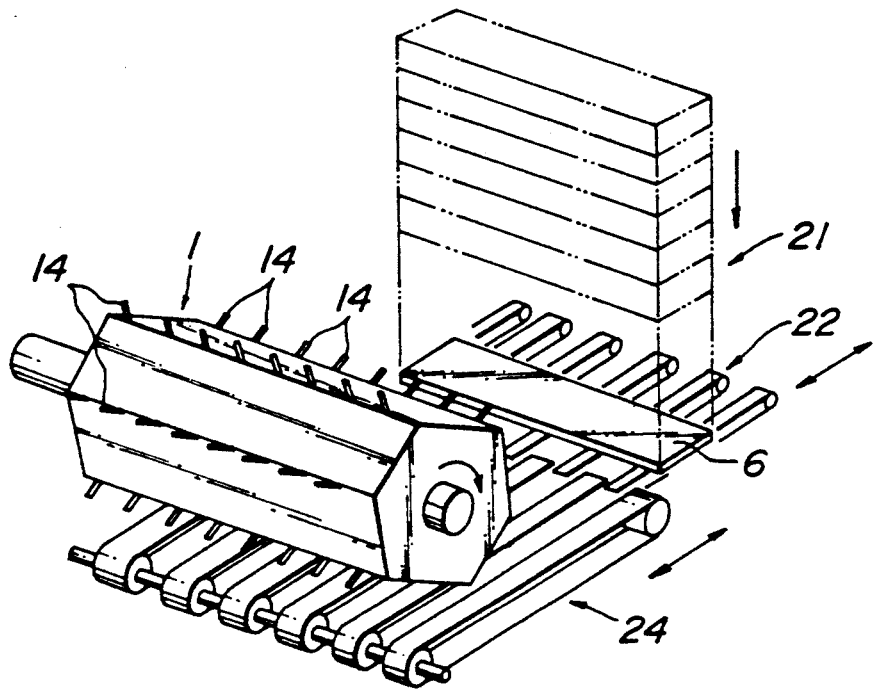
FIG. 4a is a perspective view illustrating another apparatus for carrying out the method according to the invention.
Figure 4B:
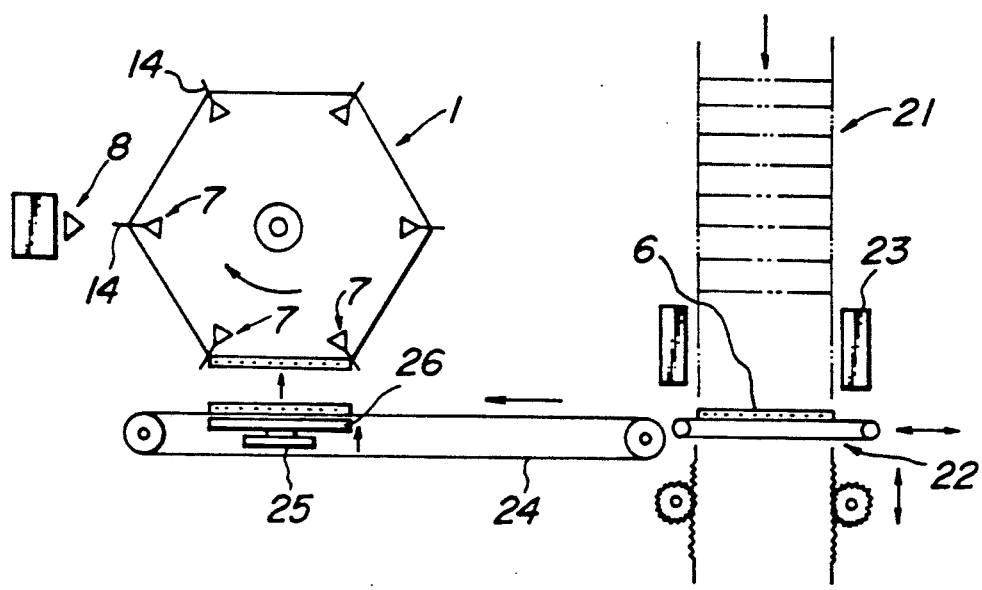

FIG. 4 illustrates another forming drum for carrying out the method according to the invention. The forming drum 1 is in the form of a hexagonal cylinder, one side of the hexagon being a length obtained by multiplying $\pi$ inches by an integral number, for example, $2\pi$ inches (integral number=2) in this embodiment. Six belt-shaped members 6 are attached to all the six flat surfaces of the hexagonal cylinder, respectively, and side edges of the belt-shaped members 6 are butt-joined with each other.

In order to attach the six belt-shaped members 6 to the hexagonal forming drum 1, a plurality of belt-shaped members 6 having a width of $2\pi$ inches are previously piled and held in a rack 21. A feeding conveyor 22 supporting thereon the rack 21 is reciprocating movable toward and away from the forming drum 1 and movable upward and downward. The belt-shaped members 6 are taken out of the rack 21 one by one through guide members 23. Each of the belt-shaped members 6 taken out of the rack 21 is transferred in the state extending in parallel with the axis of the forming drum 1 from the feeding conveyor 22 onto a transverse feeding conveyor 24. The belt-shaped member 6 is then transferred to a position immediately below one flat surface of the forming drum 1 by the transverse feeding conveyor 24. The belt-shaped member 6 is raised and attached to the flat surface of the forming drum 1 by means of a plate 26 adapted to be lifted by a cylinder 25. The similar attaching operation is repeated for remaining flat surfaces of the forming drum 1 adapted to be indexed, thereby completing the attachment of all the belt-shaped members 6 to the forming drum 1.

On the other hand, the faces of the side edges of the belt-shaped members 6 thus attached to the hexagonal forming drum 1 are butt-joined with each other on all axially extending corners of the forming drum 1 in substantially the same manner as described above. This is accomplished with the aid of inner joining means 7 arranged at inner corners of the forming drum 1, single outer joining means 8 arranged at one position outside the forming drum 1, and a plurality of pin members 14 adapted to project through the corners of the forming drum 1 and to retract into the drum radially inwardly. The forming of a ply member is completed in this manner.

According to this embodiment, the belt-shaped members 6 are easily attached to the forming drum 1 in a more reliable manner, inasmuch as the surfaces of the forming drum 1 are flat.

According to the invention, the widths of all the belt-shaped members 6 are the same values obtained by multiplying $\pi$ inches by an integral number so that the belt-shaped members can be applicable to forming drums regardless of their drum diameters. Therefore, the method according to the invention eliminates the need for preparing various kinds of belt-shaped members different in width, for storing these various kinds of belt-shaped members in wide spaces, and for changing the widths of belt-shaped members depending upon diameters of forming drums. As a result, the method according to the invention can greatly improve the operation efficiency and sufficiently save the storing spaces.

In the method according to the invention, moreover, side edges of adjacent belt-shaped members 6 are forced closer together toward each other so as to butt-join them to accomplish high quality joining. Such an effect is particularly acute in pulling closer together the side edges on the inner and outer sides of the forming drum, and in this case the joining strength is also improved.

As can be seen from the above explanation, according to the invention belt-shaped members of single kind are applicable to various kinds of forming drums. Therefore, it is possible to considerably reduce process steps for producing and storing various kinds of belt-shaped members and to save spaces for storing them. In addition thereto, changing of belt-shaped members of various sizes is not needed so that the operation efficiency can be greatly improved.

According to the invention, moreover, by performing the butt-joining of side edges of belt-shaped members by forcing the side edges closer together toward each other, the side edges can be butt-joined with high strength in sufficient accuracy.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of forming a ply member by successively attaching a plurality of belt-shaped members of a constant length to an entire circumference of a forming drum and by butt-joining side edges of the belt-shaped members adjacent circumferentially of the forming drum, comprising steps of:

forming each of the belt-shaped members to have a width equal to an integer, multiple of $\pi$;

successively attaching these belt-shaped members one by one onto a forming drum having an outer circumferential length of an integer multiple of said width and of $\pi$ inches so that side edges of the belt-shaped members are arranged in parallel with the axis of the forming drum; and forcing the adjacent side edges of the belt-shaped members closer together in circumferential directions of the forming drum to butt-join the faces of the side edges with each other, wherein the forming drum is a polygonal cylindrical forming drum, one side of the polygon having a length of an integer multiple of $\pi$ inches, and the belt-shaped members are attached to flat surfaces of the forming drum one by one.

2. The method as set forth in claim 1, wherein the forming and attaching step includes supplying a plurality of belt-shaped members each having a width equal to an integer multiple of $\pi$ and a predetermined length, one by one form a rack accommodating therein these piled members onto a feeding conveyor reciprocating movable toward and away from the forming drum and movable upward and downward, transferring the belt-shaped members one by one in a state extending in parallel with the axis of the forming drum from the feeding conveyor onto a transverse feeding conveyor and to a position immediately below the one flat surface of the forming drum, and raising the belt-shaped members one by one by means of a plate raised by a cylinder to attach the belt-shaped members one by one to the flat surfaces of the forming drum indexed with each flat surface.

3. The method as set forth in claim 1, wherein the forcing step includes steps of projecting a plurality of pin members through slits extending in the axial direction of the forming drum, said pin members formed in the forming drum with an interval corresponding to the width of the belt-shaped members in the circumferential direction of the forming drum, bringing the faces of the side edges of the belt-shaped members adjacent in the circumferential directions into contact with the pin members to produce slacks of the side edges of the belt-shaped members by contracting the forming drum to reduce its diameter, and after retracting the pin members radially inwardly, applying circumferential pulling forces to the slacks of the side edges on inner and outer sides of the forming drum to accomplish the butt-joining of the faces of the side edges of the belt-shaped members.

* * * * *